S. L. DONNELL.
Improvement in Corn Planters.

No. 124,728.  Patented March 19, 1872.

Witnesses:
E. Wolff
Geo. W. Mabee

Inventor:
Samuel L. Donnell
per Munn & Co.
Attorneys.

UNITED STATES PATENT OFFICE.

SAMUEL L. DONNELL, OF HUMBOLDT, TENNESSEE.

IMPROVEMENT IN CORN-PLANTERS.

Specification forming part of Letters Patent No. 124,728, dated March 19, 1872.

Specification describing a certain Improvement in Corn-Planters, invented by SAMUEL L. DONNELL, of Humboldt, in the county of Gibson and State of Tennessee.

Figure 1:
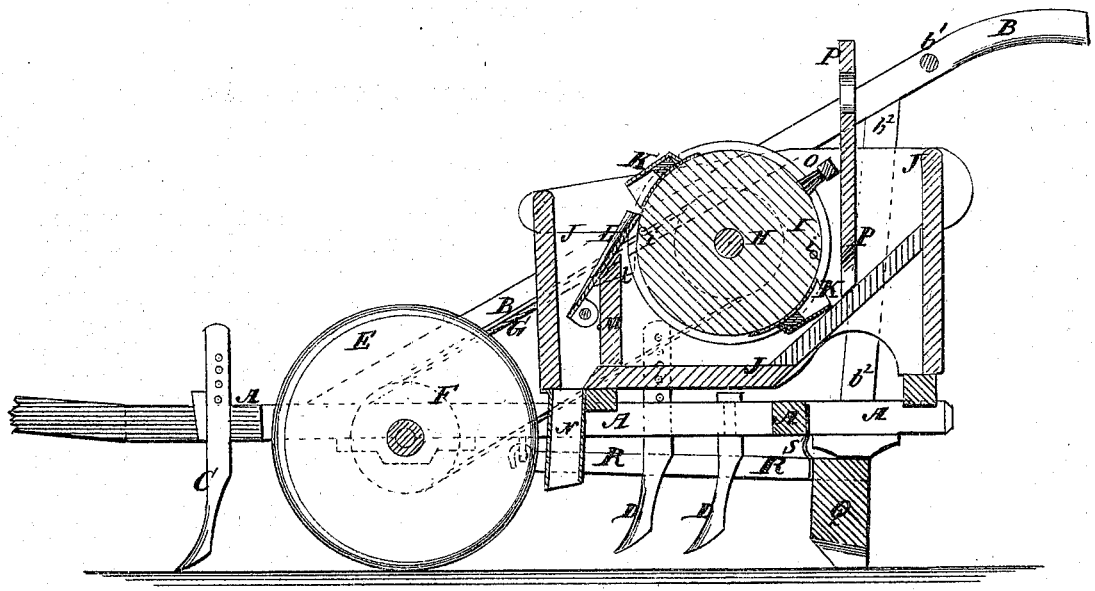
Figure 2:
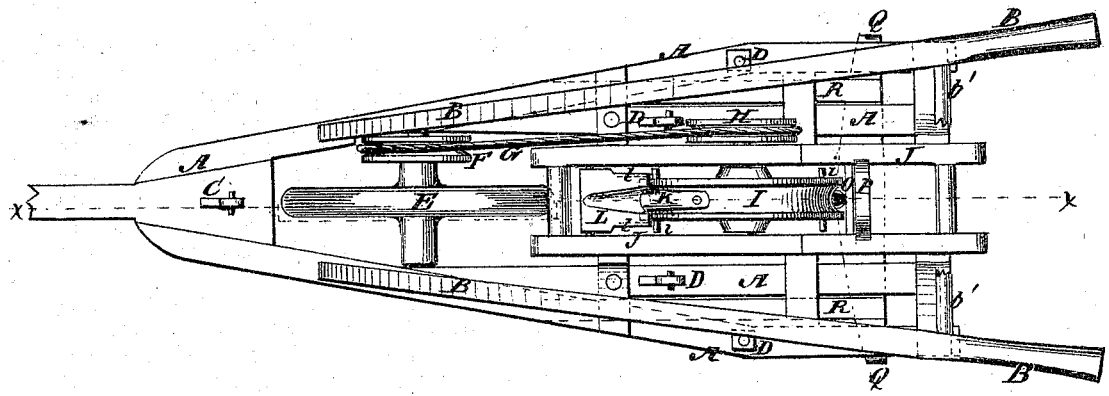

Figure 1 is a vertical longitudinal section of my improved machine taken through the line $x\ x$, Fig. 2. Fig. 2 is a top view of the same.

My invention has for its object to furnish an improved machine for planting corn and other seeds to be planted in hills, which shall be simple in construction, convenient in use, and effective, reliable, and uniform in operation; and it consists in the construction and combination of various parts of the machine, as hereinafter more fully described.

A is the frame of the machine, to the forward end of which the draft is attached. B are the handles, which are attached to the forward parts of the side bars of the frame A. The handles B are connected by a round, $b^1$, and are supported by standards $b^2$, the lower ends of which are attached to the rear parts of the side bars of the frame A. C is the opening-plow, which opens the furrow to receive the seed; and D are the covering-plows, which are designed to cover the seed, and at the same time to harrow or stir up and loosen the ground upon each side of the row. The shanks of the plows C D pass up through holes in the bars of the frame A, and are secured in place by wedges and keys or nuts, as may be desired or convenient. E is a wheel placed directly in the rear of the furrowing-plow C, and the journals of which revolve in bearings attached to the frame A. The rim of the wheel E is rounded off or made V-shaped, to press open the sides of the furrow and leave it open and smooth to receive the seed. With the wheel E is rigidly connected a pulley, F, around which passes a band, G, which also passes around a pulley, H, attached to the projecting end of one of the journals of the dropping or distributing-wheel I. The journals of the wheel I revolve in bearings formed in or attached to the sides of the box J. The face of the wheel I is grooved, as shown in Figs. 1 and 2, and in the said groove is secured one, two, or more cups, K, which are made conical, as shown in Figs. 1 and 2. The size of the cups K may be adjusted to hold any desired number of kernels or grains of the seed by plugs of cork or other suitable material, placed in them, as shown in Fig. 1. The cups K, as the wheel I revolves, take up the seed and discharge it upon the plate L, the upper part of which is corrugated, as shown in Figs. 1 and 2, to correspond with and fit into the groove of the wheel I. The plate L is pivoted at the lower ends of its side edges to the sides of the box J. The upper part of the side edges of the plate L has inclines L' formed upon it, as shown in Fig. 1, against which the pins $i'$ strike to raise the said plate L away from the wheel I to allow the cups K to pass. The pins $i'$ are attached to the sides of the wheel I a little in front of the cups K. M is a partition secured in the forward part of the box J in front of the wheel I, and in the rear of the pivoting-points of the plate L, thus forming a receiving-chamber or hopper, to receive the seed from the plate L. In the bottom of the box J, in front of the partition M, is formed a hole, through which the seed passes into the conductor-spout N, by which it is conducted into the furrow in the rear of the wheel E. O is a brush attached to the box J in such a position as to bear upon the face of the wheel I, and brush the surplus seeds from the groove in the face of the said wheel and from the mouths of the cups K, to prevent the said cups from carrying out any more seed than enough to form a hill. P is a board or plate sliding in vertical grooves in the sides of the box J, in the rear of the wheel I, to form a seed-reservoir, from which the seed passes into the lower part of the middle compartment of the box J, to be taken up by the cups K. The rear part of the bottom of the box J is made inclined, as shown in Fig. 1, so that the seed may pass freely from the seed-reservoir. By this construction, by raising the slide M less or more, less or more seed may be allowed to pass out, as may be required. The lower end of the slide M may be notched or concaved, if desired. The covering of the seed is completed, and the surface of the ground smoothed off in the rear of the covering-plows D by the covering-block Q, the lower side of which is concaved, and which is attached to the rear ends of the bars R. The forward ends of the bars R are hinged to the under side of the middle part of the side beams of the frames A, so that the block Q may drop into hollows, and thus accommodate itself to the irregularities of the surface of the ground. The covering-block Q may be connected with the rear cross-bar of the frame A by a strap, chain, or other flexible connection, S, as shown in Fig. 1.

Having thus described my invention, I claim as new and desire to secure by Letters Patent—

The combination of the hopper J, bottom apertured board P, wheel I having pins $i'$, cups K, and corrugated and pivoted plate L having inclines $L'$, when relatively arranged in a corn-planter, to operate substantially as and for the purpose described.

SAMUEL L. DONNELL.

Witnesses:
  L. K. GILLESPIE,
  H. J. BALENTINE.